March 5, 1946.  D. P. STEWARD  2,396,029
RESILIENT CAR WHEEL
Filed Jan. 11, 1943  2 Sheets-Sheet 1
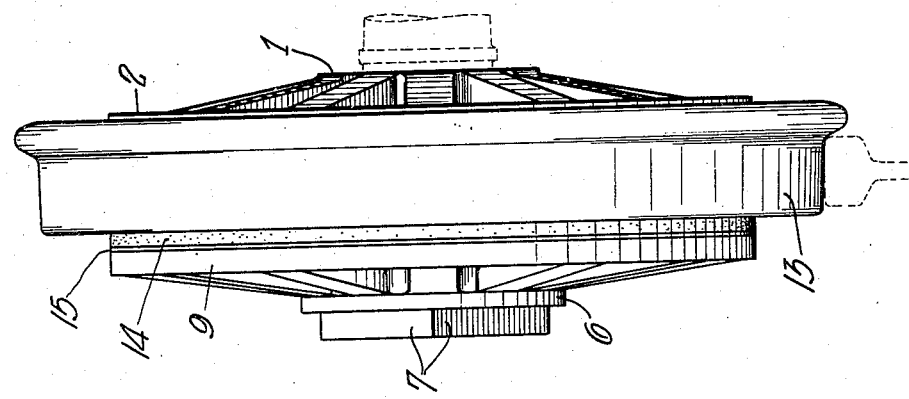
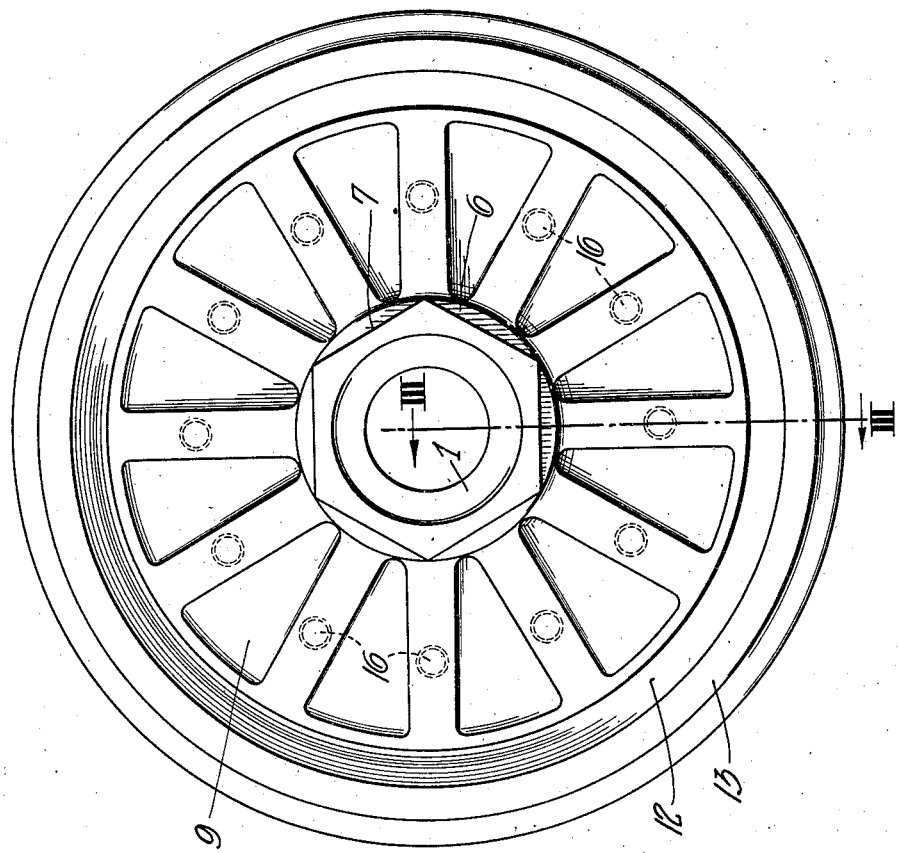
INVENTOR:
DOUGLAS P. STEWARD,
BY John E. Jackson
HIS ATTORNEY.

March 5, 1946.  D. P. STEWARD  2,396,029
RESILIENT CAR WHEEL
Filed Jan. 11, 1943  2 Sheets-Sheet 2
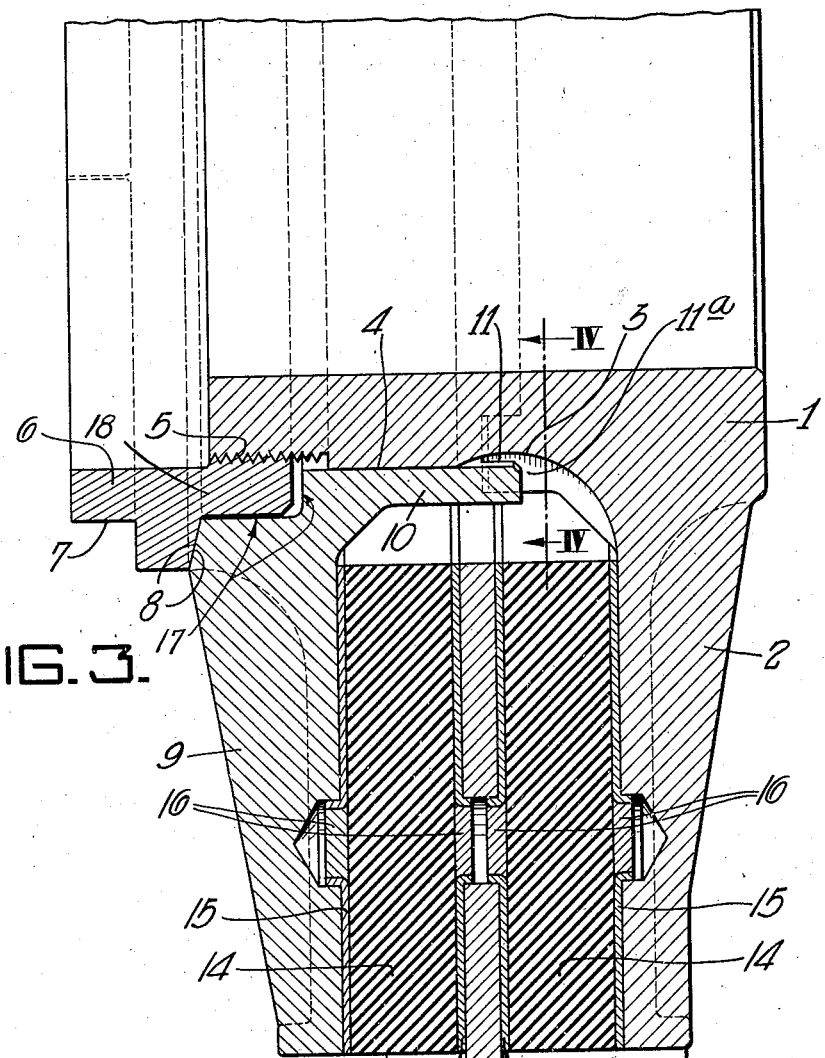
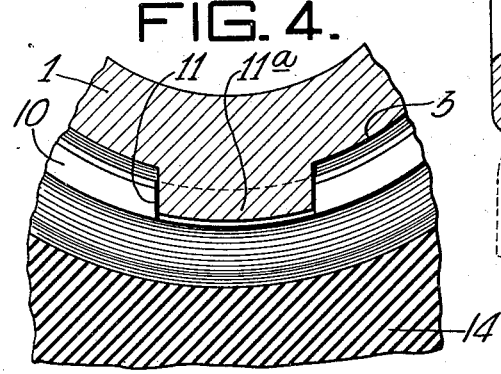
INVENTOR:
DOUGLAS P. STEWARD,
BY: John E. Jackson
HIS ATTORNEY.

Patented Mar. 5, 1946

2,396,029

UNITED STATES PATENT OFFICE 2,396,029

RESILIENT CAR WHEEL

Douglas P. Steward, Pittsburgh, Pa., assignor to Carnegie-Illinois Steel Corporation, a corporation of New Jersey Application January 11, 1943, Serial No. 472,036

1 Claim. (Cl. 295—11)

This invention relates to an improvement in the resiliency of car wheels of the resilient type, and especially to an improvement in their assembly and disassembly gained through improved construction and simplicity of design which results in noise reduction, better riding qualities of the vehicle on which they are used; and, through ease of dismantling and reassembly, a great savings in time in the maintenance of continuous service.

Heretofore, resilient wheels of the prior art embodied members consisting of a number of built-up parts, each of which requires many manufacturing operations and machine finishing to close tolerances before assembly by welding methods. Parts thus assembled necessitate normalizing at a suitable temperature to equalize stresses, after which the complete part is machine finished to close tolerances prior to final assembly into the complete wheel.

With wheels heretofore used, bearing resilient members capable of high radial deflections, it was found necessary to counteract excessive lateral deflection at the outer periphery of the abutting metallic members by the use of shouldered separator bolts equally spaced around their circumferences. This involved providing suitable clearance in the unsprung portion of the assembly such as the tire web member, metal plates bonded to rubber, and adjacent to tire web member, as well as providing suitable clearances in the rubber members themselves. This entailed the use of complicated tools in molding the rubber members and in producing the metal plates, as well as the drilling, to very close tolerances, of corresponding bolt holes in abutting members and clearance holes in the tire web member.

It is also apparent that a wheel with a definite spacing of resilient members has a predetermined amount of compression with a corresponding assembly pressure which allows for no later adjustment to compensate for pressure loss.

One of the objects of this invention is to employ resilient members with a high degree of resiliency and with corresponding members so designed that ready means of adjustment for assembly pressure losses are available.

Another object of this invention is to provide a simplified, sturdy type of abutting pressure members suitably designed to withstand the lateral forces to which a wheel of this type is subjected, with a minimum of deflection and also suitable for ready assembly and disassembly in a minimum period of time.

An additional object of this invention is to provide a suitable central pressure retaining member engaging an outer pressure member by means of an integral flange machined to effect conical contact between said members. The conical contact is effective to the maximum radial point of the retaining member, and converges toward the diametrical center of the wheel. The resultant forces thus exerted also provide for positive centralization of the outer pressure member in relation with the center line of the wheel bore, eliminating any possibility of radial movement in this member and simultaneously effecting a compressive stress on the cylindrical body of the central retaining member, resulting in a locking action on the threaded portion thereof.

A further object is to produce a resilient wheel employing an absolute minimum number of parts in which is also provided a high degree of precision and efficiency. This is effected by the reduction in the number of parts requiring closely toleranced machining operations and also by the entire elimination of certain other members with their corresponding closely machined engaging locations in the wheel assembly.

The above and still other objects will be quite evident to those skilled in the art when considered in conjunction with the accompanying drawings illustrating this wheel, in which:

Figure 1 shows a face view of the wheel.

Figure 2 is an end elevation of the wheel, as viewed from the right of Figure 1.

Figure 3 is an enlarged section on line III—III of Figure 1.

Figure 4 is a detail section on line IV—IV of Figure 3.

With reference to the above drawings, the hub 1 is designed to suit the now established axle wheel seat dimensions, to be pressed on and turn therewith. The backing member 2 is formed integral with the hub 1 and radiates therefrom to a specified diameter, being so designed to withstand with a minimum of deflection the lateral forces to which a wheel of this type is constantly subjected. The outer end of hub 1 is turned and the sleeve portion 10 of outer pressure member 9 centrally bored to a diameter that will provide the required amount of clearance at their junction 4 after hub 1 has been pressed on the axle with a resulting radial expansion of the axle at this point. The central portion of pressure member 9 is sufficiently recessed both laterally and in depth, as shown at 17, so as to provide clearance in operative arrangement from the innermost annular extension 18 of retaining member 6. The inner end of sleeve portion 10 is provided with keyways 11 which coact with keys 11ᵃ milled from the shoulder portion 3 of the hub 1 to thus provide a slidable interlocking connection between the pressure member 9 and the backing member 2 and at the same time to prevent relative rotary movement of said parts.

The outer end of hub 1 is provided with thread 5 to match the threads on retaining member 6 which has been so bored and tapped as to provide the proper amount of clearance under expanded hub condition as mentioned above.

The central pressure retaining member 6 is provided at the outer portion with hexagonal nut 7 formed integral, for turning means, and affords at the six points of the hexagon a reinforced backing at flanged portion engaging outer pressure member 9, and at its inner end with a sleeve-like annular extension 18, which is internally threaded for a short distance, as shown. This sleeve-like extension 18 is so proportioned as not to contact the pressure member 9 at surfaces 17, and thus provides free rotation of retaining member 6 with reference to pressure member 9 under all conditions of operative assembly. The surfaces 8 as shown are in contact and are so machined as to afford a positive conical seating which has the effect of centralizing the pressure member 9 in relation with the wheel bore and eliminates independent radial movement of this member, thus rigidifying the assembly. At the same time the resultant forces exerted with this type of frusto-conical seating has the effect of exerting a compressive stress on the cylindrical, internal threaded portion of retaining member 6, resulting in a locking action on threads 5.

Centrally located between members 2 and 9 is a rim web plate 12 integrally secured to a rim member 13. Separating the plate 12 from inner member 2 and outer member 9 are two resilient cushion members each consisting of a ring of resilient material 14 on each face of which is bonded a metal disc 15 having a plurality of dowels 16 projecting outwardly therefrom and engaging corresponding holes provided in plate 12 and members 2 and 9. To maintain proper engagement at all times between dowels and holes, the wheels are assembled under a substantial pressure and retained by means of central member 6 screwed on the outer threaded end of hub 1. Pressure thus exerted between each pair of plates 15 creates frictional forces which assist the dowels in carrying the radial load and also in transmitting rotational forces.

The angular spacing of the dowels 16 is such that their centers coincide with the radial center lines of spoke-like thickened radial portions 19 and 20 formed integrally on the backing member 2 and the pressure member 9 respectively. Such arrangement is regarded as advantageous since the holes 21 and 22 which receive the dowels can then be drilled to an adequate depth by using standard pointed drills without danger of penetrating the members 2 and 9.

The conical seating of the retaining member 6 in abutting relation to the pressure member 9, as shown in Figure 3, is advantageous since the above mentioned locking action on the screw threads 5 adequately insures that repeated vibrations and other forces to which the wheel structure is normally subjected in practice, will not unscrew or loosen the assembled parts.

To those skilled in the art, it will be apparent that the load applied at the hub is supported by the resilient members 14 in shear from the tire web plate 12 and that sufficient amount of clearance is provided over the outside diameter of the sleeve 10 and the inner central openings 23 and 24 in the web plate 12 and cushion members 14 to avoid contact from the resultant deflection.

Having thus described the structural features which distinguish the wheel illustrated from the teachings of the prior art, the improvements that I claim and desire to secure by Letters Patent are set forth in the appended claim.

I claim:

A resilient wheel of the character described, comprising a rim having a unitary inwardly extended web flanked on opposite sides by respective resilient cushion members, a unitary one-piece backing member including a flanged portion engaging one of the cushion members and a central hub portion whose outer end is threaded, a pressure member having a central sleeve encircling the hub portion of the backing member and slidable thereon and having a radial flange engaging said other cushion member, the outer end of said pressure member having a frusto-conical recessed seat in the axial zone thereof, a retaining member having a frusto-conical abutment shoulder on its outer periphery extending axially inward for coaction with the recessed seat of the pressure member, and an inwardly extending internally threaded cylindrical extension on said retaining member for engagement with the outer threaded end of said hub but out of engagement with the adjacent surface of said pressure member, to provide end clearance, adapted to permit the retaining member to be screwed inwardly to compress said cushion members after they become worn in service and also effective to exert a locking action on the screw-threaded connection to adequately lock the parts against loosening under the influence of vibrations and other forces to which a wheel structure having said cushion members incorporated therein is normally subjected in practice.

DOUGLAS P. STEWARD.